(12) United States Patent
Li

(10) Patent No.: US 6,307,009 B1
(45) Date of Patent: *Oct. 23, 2001

(54) HIGH CATALYST PHENOLIC RESIN BINDER SYSTEM

(75) Inventor: Jianjun Li, Westerville, OH (US)

(73) Assignee: Owens Corning Fiberglas Technology, Inc., Summit, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,561

(22) Filed: Dec. 29, 1999

(51) Int. Cl.$^7$ ........................................ C08G 8/10

(52) U.S. Cl. ............... 528/489; 528/129; 528/140; 528/147; 528/173; 528/230; 528/486; 528/488; 528/503

(58) Field of Search ................... 528/489, 129, 528/140, 147, 173, 230, 486, 488, 503

(56) References Cited

U.S. PATENT DOCUMENTS

| | | |
|---|---|---|
| 30,375 | 8/1980 | Deuzeman et al. . |
| 4,052,359 | 10/1977 | Higginbottom . |
| 4,255,485 | 3/1981 | Yau . |
| 4,663,419 | 5/1987 | Fugier et al. . |
| 4,710,406 | 12/1987 | Fugier et al. . |
| 4,904,516 | 2/1990 | Creamer . |
| 4,956,409 | 9/1990 | Sieloff . |
| 5,451,657 | 9/1995 | Chappelie . |
| 5,686,561 | 11/1997 | Rahman . |

FOREIGN PATENT DOCUMENTS

| | | |
|---|---|---|
| 733568 | 7/1955 | (GB) . |
| 1023881 | 3/1966 | (GB) . |
| 00/78834 | 12/2000 | (WO) . |

*Primary Examiner*—Duc Truong
(74) *Attorney, Agent, or Firm*—Inger H. Eckert; Stephen W. Barns

(57) ABSTRACT

An aqueous binder composition suitable for use as a binder in making wool and board products including fiberglass insulation comprising a phenolic resole resin binder made from phenol and formaldehyde by using an excess amount of a basic catalyst.

6 Claims, No Drawings

HIGH CATALYST PHENOLIC RESIN BINDER SYSTEM

TECHNICAL FIELD AND INDUSTRIAL APPLICABILITY OF THE INVENTION

This invention relates to binders for glass fibers. More particularly, this invention relates to improved phenolic resin binder compositions for use in manufacturing articles containing glass fibers wherein improved phenolic resins serves as a binder for the glass fibers

BACKGROUND OF THE INVENTION

The use of aqueous dispersions of phenolic resole resins as binders in the production of wool and board products made from glass and other vitreous fibers is common place. It has been suggested that urea can be mixed with, but not appreciably reacted, with the phenolic resoles and that the resulting mixtures are useful in the production of wools and boards from glass fibers and other vitreous fibers. The addition of the urea serves several purposes. U.S. Pat. No. 4,255,485 assigned to the assignee of the present invention and incorporated by reference herein, discloses that urea is added to a phenol-formaldehyde condensate in an amount sufficient to scavenge free formaldehyde. See also U.S. Pat. No. 4,956,409 also assigned to the assignee of this invention and incorporated by reference herein, which likewise teaches that it is advantageous to mix urea with phenolic resole resins for use in making products from glass fibers.

In the manufacture of phenolic resole resins, with or without urea modification, it is highly desirable to provide a process for manufacturing the resole resin where the amount of free phenol and formaldehyde remaining after the reaction is held to a minimum. As noted, U.S. Pat. No. 4,255,485 discloses that urea, when added to the phenolic resole resin, reduces the amount of free formaldehyde by reacting with the formaldehyde. To accomplish the objective of low emissions the mol ratio of formaldehyde to phenol is kept above 1. Typical ratios are from about 2 about 4.5. In this way, the amount of free phenol is maintained at a low level.

In preparing phenolic resole resins the catalysts of choice have been the hydroxides of alkali or alkaline-earth metals such as sodium, potassium, calcium and barium hydroxides. The conventional wisdom within the field has been to use about 5 to 8.5% by weight of such a catalyst, based on the weight of phenol used, so that the formation of undesirable insoluble salts are not formed during the subsequent neutralization of the base catalyst with acids such as sulfuric acid. See for example U.S. Pat. Nos. 4,663,419, 4,956,409, and 4,904,516. Some prior patents discuss the need to remove the undesired salt formed during the neutralization reaction. See for example the '409 and '516 Patents just described and U.S. Pat. No. 4,710,406 that discloses in Example 7 that 14.5% by mole of the basic catalyst based on the weight of phenol will produce an unsatisfactory resin.

SUMMARY OF THE INVENTION

In contrast to the use of low amounts of a basic catalyst, i.,e., less than 10% by weight based on the weight of phenol, it has been discovered that phenolic resole resins can be made using large amounts of catalyst and that by doing so certain significant advantages can be achieved. More particularly, if an amount of base catalyst, as for example sodium or calcium hydroxide is used in an amount of over about 15%, and preferably over 20% by weight of the phenol employed, a salt will be formed when the resin is neutralized. While heretofore this was deemed to be detrimental and was to be avoided, certain important advantages are obtained when the formaldehyde to phenol ratio is between about 3.0/1 to 4.5/1. While the removed salt must be removed before the resin can be used, the salt may be used as a raw material in the production of the glass from which the fibers will be formed. As a result of using an excess amount of the basic catalyst the amount of free phenol and formaldehyde is reduced thus eliminating other expensive means for reducing emissions from those compounds emissions. Another advantage of the process is that the molecular weight distribution of the resins so produced will be improved in that there will be a narrow molecular weight distribution which will improve the processability of the resin. Intentionally causing the precipitation by defining and controlling the parameters of the precipitation, such as the crystalline form of the salt produced and its solubility can also lead to the production of a resin that has minimal amounts of residual soluble catalyst. This will extend the storage life of the resin.

It has been found that phenolic resole resins, consisting mainly of one to three ring compounds, can be made by reacting formaldehyde with phenol in a mol ratio of about 3.0/1 to 4.5/1 in the presence of at least 10% of a basic catalyst, based on the weight of phenol, under controlled conditions of temperature and time. The reaction is allowed to proceed to a point where the free formaldehyde is below about 16% and the free phenol is below about 1%. The catalyst is preferably sodium or calcium hydroxide and the preferred acid for neutralization of the catalyst and for the intentional salt formation is sulfuric acid. The resultant precipitate of sodium sulfate can be removed by conventional filtration or other types of separation. The sodium sulfate can be used to manufacture the glass from which glass fibers can be made by any suitable means.

In the production of fiberglass insulation, the phenolic resole resin can be mixed with or reacted with urea. When the urea is reacted with the phenolic resole it can be used in mol ratio of about 0.5 to 1.5 of free formaldehyde left in resin.

DETAILED DESCRIPTION OF THE INVENTION AND THE PREFERRED EMBODIMENTS OF THE INVENTION

The present invention can employ, as starting materials, a phenol and an aldehyde selected from those heretofore utilized in the production of phenolic resole resins that are useful for binder application. More particularly, the resole resin can be the partial condensation product of any suitable phenol with any suitable aldehyde (for a discussion of resoles, see Martin, The Chemistry of phenolic Resin, John Wiley & Sons, Inc., New York. 19156, particularly pages 87 through 98, and cited references). As a practical matter, however, a resole curable to an infusible recite is usually preferred for use in connection with vitreous fibers so that at least a significant amount of a trifunctional phenol, usually hydroxy benzene for economic reasons, is preferably employed. Formaldehyde, 50% acqueous solution, for economic reasons and because of the greater simplicity of its chemical reactions with a phenol, is the preferred aldehyde. Most desirably, the resole resin is produced by reaction of formaldehyde with phenol (hydroxy benzene) in proportions from about 3.0 mols to about 4.5 mols of formaldehyde per mol of phenol.

The preferred formaldehyde to phenol ratio is about 3.8/1. By using an excess of formaldehyde the amount of free phenol can be partially controlled. However, the use of an excess amount of catalyst will ensure the most complete reaction.

The basic catalyst is preferably a hydroxide of an alkali or alkaline earth hydroxide such as sodium, potassium or calcium. Preferred is sodium hydroxide and calcium hydroxide. Calcium oxide can also be used. After neutralization with an acid such as sulfuric acid, there will be produced sodium or calcium sulfate which may be used in the production of glass fiber. The amount of basic catalyst employed should be at least 10% and preferably over 20% by weight of the phenol used. This excessive amount insures that as much phenol as possible is reacted.

EXAMPLE 1
(Formaldehyde/Phenol=4.25/1, NaOH 20 wt % of Phenol)

188.2 g (2 mole) of phenol are added to 510.5 g of a 50% aqueous formaldehyde (8.5 mole) solution in a 1 liter reactor with a stirrer, condenser, cooling coil, thermometer and reactant inlet. The temperature is regulated by means of a water bath. The mixture is heated/or cooling to 46° C. depending on the temperature of the reactants, with stirring, and 75.3 g (0.94 mole) of a 50% aqueous NaOH solution (20 wt % of pure NaOH based on the weight of phenol) are introduced at a uniform rate over a period of 60 minutes and the temperature is maintained at 46° C. using cooling water. The temperature is then raised to 52° C. and the temperature is maintained at 52° C. for 1 hour. Then the temperature is raised to 60° C. and the free phenol is measured using Gas Chromatography (GC) and the reactor is cooled to about 25° C. when the reaction is completed, i.e., when the free phenol reaches 0.5%. Then the resin is cooled to 5° C. and about 207.5 g (0.42 mole) of $H_2SO_4$ is added to neutralize the NaOH and a precipate is formed that is believed to be $Na_2SO_4 \cdot 10H_2O$. The salt is filtered from the mixture using filter paper or any other conventional means. It then is used as raw material in glass batch for the manufacturing of fiberglass.

EXAMPLE 2
(Formaldehyde/Phenol=4.25/1, NaOH 30 wt % of Phenol)

188.2 g (2 mole) of phenol are added to 510.5 g of a 50% aqueous formaldehyde (8.5 mole) solution is a 1 liter reactor with a stirrer, condenser, cooling coil, thermometer and reactant inlet. The temperature is regulated by means of a water bath. The mixture is heated/or cooling to 46° C. depending on the temperature of the reactants, with stirring, and 112.9 g (1.41 mole) of a 50% aqueous NaOH solution (20 wt % of pure NaOH based on the weight of phenol) are introduced at a uniform rate over a period of 60 minutes and the temperature is maintained at 46° C. using cooling water. The temperature is then raised to 52° C. and the temperature is maintained at 52° C. for 1 hour. Then the temperature is raised to 60° C. and the free phenol is measured using Gas Chromatography (GC) and the reactor is cooled to about 25° C. when the reaction is completed, i.e., when the free phenol reaches 0.5%. Then the resin is cooled to 5° C. and about 311.3 g (0.64 mole) of $H_2SO_4$ is added to neutralize the NaOH and a precipate is formed that is believed to be $Na_2SO_4 \cdot 10H_2O$. The salt is filtered from the mixture using filter paper or other conventional means. It then is used as raw material in glass batch for the manufacturing of fiberglass.

EXAMPLE 3
(Formaldehyde/Phenol=4.25/1, NaOH 10 wt % of Phenol)

188.2 g (2 mole) of phenol are added to 510.5 g of a 50% aqueous formaldehyde (8.5 mole) solution is a 1 liter reactor with a stirrer, condenser, cooling coil, thermometer and reactant inlet. The temperature is regulated by means of a water bath. The mixture is heated/or cooling to 46° C. depending on the temperature of the reactants, with stirring, and 37.6 g (0.47 mole) of a 50% aqueous NaOH solution (20 wt % of pure NaOH based on the weight of phenol) are introduced at a uniform rate over a period of 60 minutes and the temperature is maintained at 46° C. using cooling water. The temperature is then raised to 52° C. and the temperature is maintained at 52° C. for 1 hour. Then the temperature is raised to 60° C. and the free phenol is measured using Gas Chromatography (GC) and the reactor is cooled to about 25° C. when the reaction is completed, i.e., when the free phenol reaches 0.5%. Then the resin is cooled to 5° C. and about 103.8 g (0.21 mole) of $H_2SO_4$ is added to neutralize the NaOH and a precipate is formed that is believed to be $Na_2SO_4 \cdot 10H_2O$. The salt is filtered from the mixture using filter paper or other conventional means. It then is used as raw material in glass batch for the manufacturing of fiberglass.

EXAMPLE 4
(Formaldehyde/Phenol=3.8/1, NaOH 20 wt % of Phenol 188.2 g (2 mole) of phenol are added to 456.5 g of a 50% aqueous formaldehyde (7.6 mole) solution is a 1 liter reactor with a stirrer, condenser, cooling coil, thermometer and reactant inlet. The temperature is regulated by means of a water bath. The mixture is heated/or cooling to 46° C. depending on the temperature of the reactants, with stirring, and 75.3 g (0.94 mole) of a 50% aqueous NaOH solution (20 wt % of pure NaOH based on the weight of phenol) are introduced at a uniform rate over a period of (30 minutes and the temperature is maintained at 46° C. using cooling water. The temperature is then raised to 52° C. and the temperature is maintained at 52° C. for 1 hour. Then the temperature is raised to 60° C. and the free phenol is measured using Gas Chromatography (GC) and the reactor is cooled to about 25° C. when the reaction is completed, i.e., when the free phenol reaches 0.5%. Then the resin is cooled to 5° C. and about 207.5 g (0.42 mole) of $H_2SO_4$ is added to neutralize the NaOH and a precipate is formed that is believed to be $Na_2SO_4 \cdot 10H_2O$. The salt is filtered from the mixture using filter paper or other conventional means. It then is used as raw material in glass batch for the manufacturing of fiberglass.

EXAMPLE 5
(Formaldehyde/Phenol=3/1, NaOH 20 wt % of Phenol 235.3 g (2.5 mole) of phenol are added to 450.4 g of a 50% aqueous formaldehyde (7.5 mole) solution is a 1 liter reactor with a stirrer, condenser, cooling coil, thermometer and reactant inlet. The temperature is regulated by means of a water bath. The mixture is heated/or cooling to 46° C. depending on the temperature of the reactants, with stirring, and 94.1 g (1.18 mole) of a 50% aqueous NaOH solution (20 wt % of pure NaOH based on the weight of phenol) are introduced at a uniform rate over a period of 60 minutes and the temperature is maintained at 46° C. using cooling water. The temperature is then raised to 52° C. and the temperature is maintained at 52° C. for 1 hour. Then the temperature is raised to 60° C. and the free phenol is measured using Gas Chromatography (GC) and the reactor is cooled to about 25° C. when the reaction is completed, i.e., when the free phenol reaches 0.7%. Then the resin is cooled to 5° C. and about 259.4 g (0.53 mole) of $H_2SO_4$ is added to neutralize the NaOH and a precipate is formed that is believed to be $Na_2SO_4 \cdot 10H_2O$. The salt is filtered from the mixture using filter paper or other conventional means. It then is used as raw material in glass batch for the manufacturing of fiberglass.

EXAMPLE 6

(Formaldehyde/Phenol=3.8/1, $Ca(OH)_2$, 20 wt % of Phenol 188.2 g (2 mole) of phenol are added to 456.5 g of a 50% aqueous formaldehyde (8.5 mole) solution is a 1 liter reactor with a stirrer, condenser, cooling coil, thermometer and reactant inlet. The temperature is regulated by means of a water bath. The mixture is heated/or cooling to 46° C. depending on the temperature of the reactants, with stirring, and 75.3 g (0.508 mole) of a 50% aqueous $CaOH_2$ slurry (20 wt % of pure $CaOH_2$ based on the weight of phenol) are introduced at a uniform rate over a period of 60 minutes and the temperature is maintained at 46° C. using cooling water. The temperature is then raised to 52° C. and the temperature is maintained at 52° C. for 1 hour. Then the temperature is raised to 60° C. and the free phenol is measured using Gas Chromatography (GC) and the reactor is cooled to about 25° C. when the reaction is completed, i.e., when the free phenol reaches 0.5%. Then the resin is cooled to 5° C. and about 224.4 g (0.46 mole) of $H_2SO_4$ is added to neutralize the NaOH and a precipate is formed that is believed to be $Ca_2SO_4 \cdot 10H_2O$. The salt is filtered from the mixture using filter paper or other conventional means. It then is used as raw material in glass batch for the manufacturing of fiberglass.

What is claimed is:

1. A method of preparing water soluble phenolic binders for use in making wool and board products comprising;

preparing an aqueous mixture including a formaldehyde, a phenol and a basic catalyst, said catalyst being present in an amount of at least 20% based on the weight of phenol;

the mol ratio of formaldehyde to phenol ratio being between about 3.0/1 and 4.5/1;

heating said mixture;

maintaining the mixture for a time and a temperature so that the free formaldehyde content of the mixture falls to a predefined level and the free phenol level is less than 1% ;

neutralizing the catalyst with an acid, said acid reacting with the basic catalyst so as to form a salt that precipitates from the mixture;

and separating the salt from the mixture.

2. The process of claim 1 wherein the basic catalyst is an alkali metal hydroxide or an alkaline earth metal hydroxide.

3. The process of claim 1 or claim 2 wherein the precipitated salt is used as a raw material in the production of the glass fiber insulation.

4. The process of claim 1 wherein the basic catalyst is selected from the group consisting of sodium hydroxide, calcium hydroxide and calcium oxide.

5. A binder for use in binding wool and board products made by the method of claim 1.

6. Fiberglass insulation made with the binder made in accordance with the method of claim 1.

* * * * *